US012704929B2

(12) United States Patent
Deng et al.

(10) Patent No.: US 12,704,929 B2
(45) Date of Patent: Aug. 11, 2026

(54) TOUCH SENSOR DEVICES

(71) Applicant: SHENZHEN SHOKZ CO., LTD., Shenzhen (CN)

(72) Inventors: Wenjun Deng, Shenzhen (CN); Yongshuai Yuan, Shenzhen (CN); Yujia Huang, Shenzhen (CN); Wenbing Zhou, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/955,929

(22) Filed: Nov. 21, 2024

(65) Prior Publication Data

US 2025/0085816 A1 Mar. 13, 2025

Related U.S. Application Data

(63) Continuation of application No. PCT/CN2023/071906, filed on Jan. 12, 2023.

(51) Int. Cl.
*G06F 3/043* (2006.01)

(52) U.S. Cl.
CPC .................................... *G06F 3/043* (2013.01)

(58) Field of Classification Search
CPC .... H04R 1/028; H04R 1/04; H04R 2201/003; H03K 17/964; H03K 2217/9651; H03K 2217/94005; H03K 2217/96062; G06F 3/043
See application file for complete search history.

(56) References Cited

U.S. PATENT DOCUMENTS 4,634,917 A * 1/1987 Dvorsky .............. H10N 30/302 310/366
9,661,411 B1 * 5/2017 Han ..................... H04R 31/006
10,488,990 B2 * 11/2019 Ting ...................... G06F 1/3231
12,172,886 B2 * 12/2024 Ho ........................ B81B 7/0006
12,356,140 B2 * 7/2025 Deng ....................... H04R 1/04
(Continued)

FOREIGN PATENT DOCUMENTS

CN 105045430 A 11/2015
CN 106708395 A 5/2017
(Continued)

OTHER PUBLICATIONS

International Search Report in PCT/CN2023/071906 mailed on Sep. 6, 2023, 7 pages.
(Continued)

*Primary Examiner* — Olga V Merkoulova
(74) *Attorney, Agent, or Firm* — METIS IP LLC

(57) ABSTRACT

The embodiments of the present disclosure provide a touch sensor device. The touch sensor device comprises a housing, configured to provide a touch region; and at least one sensor, configured to be fixed near the touch region. The at least one sensor includes: a signal transmitting unit, configured to generate a vibration signal under the action of an excitation signal; a signal receiving unit, configured to receive the vibration signal and generate an output signal; and a processor, configured to recognize a touch operation performed on the touch region according to the output signal.

20 Claims, 9 Drawing Sheets

(56) References Cited

U.S. PATENT DOCUMENTS

| | | | | |
|---|---|---|---|---|
| 12,546,647 | B2 * | 2/2026 | Yuan | G01H 3/06 |
| 2007/0261910 | A1 * | 11/2007 | Kasai | G01H 11/06 216/57 |
| 2019/0121460 | A1 | 4/2019 | Ting | |
| 2021/0242393 | A1 * | 8/2021 | Tang | G06F 3/044 |
| 2023/0289011 | A1 * | 9/2023 | Rosenberg | G06F 3/03545 |
| 2023/0300536 | A1 * | 9/2023 | Deng | H04R 7/20 381/190 |
| 2023/0362524 | A1 | 11/2023 | Yuan et al. | |
| 2024/0053852 | A1 * | 2/2024 | Rosenberg | G06F 3/04162 |

FOREIGN PATENT DOCUMENTS

| | | | | |
|---|---|---|---|---|
| CN | 105045430 | B | * | 2/2019 |
| CN | 115086815 | A | | 9/2022 |
| JP | 2009035199 | A | * | 2/2009 |
| JP | 5214926 | B2 | * | 6/2013 |

OTHER PUBLICATIONS

Written Opinion in PCT/CN2023/071906 mailed on Sep. 6, 2023, 5 pages.

The Extended European Search Report in European Application No. 23915334.9 mailed on Jul. 3, 2025, 10 pages.

* cited by examiner

420

520

620

900

1000

TOUCH SENSOR DEVICES

CROSS-REFERENCE TO RELATED APPLICATIONS

This application is a continuation of International Application No. PCT/CN2023/071906, filed on Jan. 12, 2023, the entire contents of which are incorporated herein by reference.

TECHNICAL FIELD

The present disclosure relates to the field of touch sensing, and in particular to a touch sensor device.

BACKGROUND

As an important method of human-computer interaction, touch sensing has been widely used in various electronic products. Touch sensing requires the touch sensor to generate changes in electrical signals under stimulation such as tapping, long pressing, and sliding. The current touch sensors mainly include capacitive touch sensors, piezoresistive touch sensors, and compressive touch sensors. However, the capacitive touch sensors are easily disturbed by factors such as liquids and have a high false touch rate. The piezoresistive touch sensors have large errors in case of temperature changes and need to set temperature compensation or be used under a constant temperature condition. The compressive touch sensors have high requirements on the rigidity of the electronic product housing, and users must apply a large pressing force during use, which has many restrictions on design and use.

Therefore, it is desirable to provide a touch sensor device that is not easily disturbed by external factors, so as to meet the packaging requirements of electronic products.

SUMMARY

One of the embodiments of the present disclosure provides a touch sensor device. The touch sensor device may comprise housing, configured to provide a touch region; and at least one sensor, configured to be fixed near the touch region. The at least one sensor may include: a signal transmitting unit, configured to generate a vibration signal under the action of an excitation signal; a signal receiving unit, configured to receive the vibration signal and generate an output signal; and a processor, configured to recognize a touch operation performed on the touch region according to the output signal.

In some embodiments, a frequency of the excitation signal may not be less than 16000 Hz.

In some embodiments, the signal transmitting unit may include a piezoelectric patch. The signal receiving unit may include an air conduction microphone. The air conduction microphone may include a diaphragm. A cavity may be formed between the piezoelectric patch and the diaphragm.

In some embodiments, the air conduction microphone may include a microphone housing. The microphone housing may form an accommodation cavity for accommodating the diaphragm. The diaphragm may be configured to divide the accommodation cavity into a front cavity and a rear cavity. The cavity may be in flow communication with the front cavity. The processor may be disposed in the rear cavity.

In some embodiments, the signal transmitting unit may include a first piezoelectric patch. The signal receiving unit may include a second piezoelectric patch. The first piezoelectric patch and the second piezoelectric patch may be stacked in a vibration direction of the first piezoelectric patch.

In some embodiments, the processor may be integrally packaged with the first piezoelectric patch and the second piezoelectric patch.

In some embodiments, the excitation signal may include a single-frequency electrical signal. The processor may be configured to determine whether a touch occurs according to an amplitude of an output signal corresponding to the single-frequency electrical signal.

In some embodiments, the excitation signal may include electrical signals of multiple frequencies. The output signal may include output signals of multiple frequencies corresponding to the electrical signals of multiple frequencies. The processor may be configured to perform a weighting operation on the output signals of multiple frequencies and determine whether the touch occurs based on a result of the weighting operation.

In some embodiments, the excitation signal may include a sweep-frequency electrical signal. The output signal may include a sweep-frequency output signal corresponding to the sweep-frequency electrical signal. The processor may be configured to obtain a curve corresponding to the sweep-frequency output signal and determine whether the touch occurs according to a shape of the curve.

In some embodiments, an excitation mode of the excitation signal may include a continuous excitation or an interval excitation.

In some embodiments, the at least one sensor may include two or more sensors. The two or more sensors may form a sensor array near the touch region.

In some embodiments, the touch operation performed on the touch region may include a sliding touch or a pressing touch.

One of the embodiments of the present disclosure provides a touch sensor device. The touch sensor device may comprise a housing, configured to provide a touch region; and a sensor, configured to be fixed near the touch region. The sensor may include: a vibration element; an inductor element, the vibration element and the inductor element being connected in parallel to form a loop, and the loop oscillating under the action of an excitation signal to generate an output signal; and a processor, configured to recognize a touch operation performed on the touch region according to an oscillation frequency of the output signal.

In some embodiments, the vibration element may include a piezoelectric patch.

In some embodiments, a resonance frequency of the piezoelectric patch may be in a range of 100 kHz-100 MHz.

In some embodiments, an inductance value of the inductor element may be in a range of 0.1 uH-100 uH.

In some embodiments, the sensor may further include a capacitor element. The capacitor element may be connected to the vibration element and the inductor element to form a loop.

In some embodiments, the capacitor element may be connected in series or in parallel with the vibration element.

In some embodiments, a value of a quality factor of the loop may be greater than 2.

In some embodiments, an excitation mode of the excitation signal may include a continuous excitation or an interval excitation.

DETAILED DESCRIPTION

Figure 1:
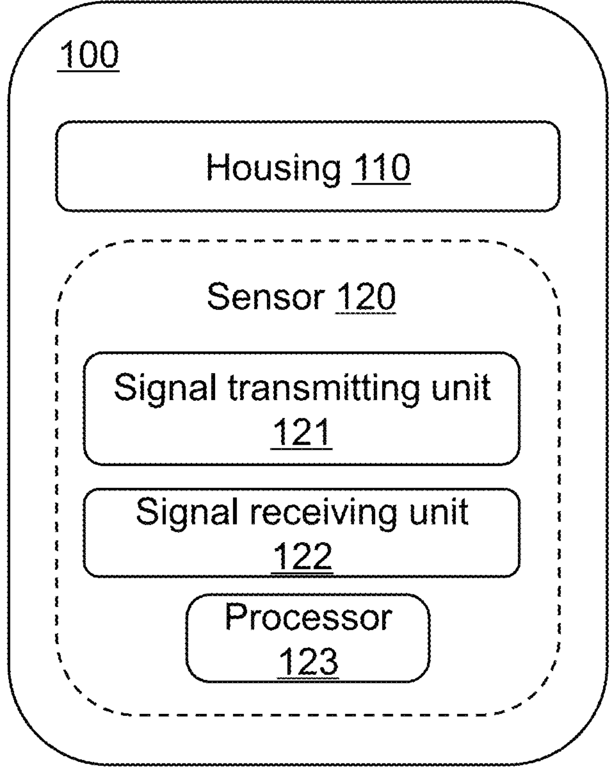
FIG. 1 is a block diagram illustrating a touch sensor device according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms “system,” “device,” “unit,” and/or “module” used herein are a way to distinguish between different components, elements, parts, sections, or assemblies at different levels. However, the terms may be replaced by other expressions if other words accomplish the same purpose.

As shown in the present disclosure and in the claims, unless the context clearly suggests an exception, the words “one,” “a,” “an,” “one kind,” and/or “the” do not refer specifically to the singular, but may also include the plural. Generally, the terms “including” and “comprising” suggest only the inclusion of clearly identified steps and elements, however, the steps and elements that do not constitute an exclusive list, and the method or apparatus may also include other steps or elements.

The embodiments of the present disclosure provide a touch sensor device. In some embodiments, the touch sensor device may include at least one sensor and a housing. The housing may be configured to provide a touch region. The at least one sensor may be connected to the housing and disposed near the touch region. In some embodiments, the at least one sensor may include a signal transmitting unit. The signal transmitting unit may be configured to generate a vibration signal under the action of an excitation signal. In some embodiments, when the signal transmitting unit vibrates, the signal transmitting unit may drive the housing and other components to vibrate together to form a vibration system. Changing an equivalent stiffness, mass, damping, and other parameters of the housing may affect a vibration mode of the entire vibration system, and the vibration signal generated by the signal transmitting unit may change correspondingly. When a user (e.g., through a finger, a stylus, etc.) slides on or presses the touch region, a part (e.g., the finger or the stylus) of the user gives an additional mass and an additional damping to the vibration system, and the vibration mode of the vibration system changes correspondingly. For example, when the user slides on or presses the touch region, a resonance frequency of the vibration system decreases and a resonance peak moves forward. As another example, when the user slides on or presses the touch region, an amplitude corresponding to the resonance peak of the vibration system decreases. As another example, when the user slides on or presses the touch region, a Q value of a quality factor of the vibration system decreases, the Q value being related to a difference between the resonance peak and a resonance valley. In some embodiments, the at least one sensor may further include a signal receiving unit and a processor. The signal receiving unit may be configured to receive the vibration signal and generate an output signal. The processor may be configured to recognize a touch operation performed on the touch region based on the output signal. In some embodiments, the output signal generated by the signal receiving unit may change with the change of the vibration signal, and the processor may determine the touch operation of the user based on the output signal. For example, the processor may determine whether the user is tapping or long pressing by detecting the time when the output signal changes. As another example, the processor may determine whether the user is pressing hard or lightly by detecting the amplitude of the change in the output signal. The touch sensor device provided by the embodiments of the present disclosure may generate a change in the vibration signal in response to the user contact, and determine the touch operation of the user based on the change, which is not affected by factors such as a human body movement, external capacitance, a temperature change, and a housing stiffness, thereby achieving good sensitivity.

In some embodiments, the touch sensor device may include at least two sensors. The at least two sensors may be arranged near the touch region. When the user touches the at least two sensors, the processor may determine the touch operation (e.g., a sliding direction, a sliding shape, etc.) of the user based on positions of the at least two sensors and the time when the output signal changes. In some embodiments, the at least two sensors may be distributed in an array or along a curve such as an arc.

The touch sensor device provided by the embodiments of the present disclosure is described in detail below with reference to the accompanying drawings.

FIG. 1 is a block diagram illustrating a touch sensor device according to some embodiments of the present disclosure. As shown in FIG. 1, a touch sensor device 100 may include a housing 110 and at least one sensor 120.

The touch sensor device 100 refers to a device capable of converting a user contact on a specific region on the device into an electrical signal. For example, a touch operation of a user may act on a surface of the touch sensor device 100. In some embodiments, the touch operation may include but is not limited to point touch, long press, slide, etc. In some embodiments, the user may act on a local region of the surface of the touch sensor device 100 to cause a change in an overall mass and damping of the touch sensor device 100, such that a transducer (e.g., the at least one sensor 120) of the touch sensor device 100 may convert the change in the mass and the damping into the electrical signal.

The housing 110 may be configured to provide a touch region and accommodate the at least one sensor 120. In some embodiments, the touch region may be disposed on a surface of the housing 110. The housing 110 may form an inner cavity. The at least one sensor 120 may be disposed in the inner cavity and connected to the housing 110. "Connection" in the present disclosure refers to the connection between different parts on the same structure, or after preparing different parts or structures separately, each independent part or structure is fixedly connected by welding, riveting, clamping, bolting, adhesive bonding, etc., or during the preparation process, the first part or structure is deposited on the second part or structure by physical deposition (e.g., physical vapor deposition) or chemical deposition (e.g., chemical vapor deposition). In some embodiments, the touch region may be seamlessly connected to other regions on the surface of the housing 110. In some embodiments, the touch region may be integrated with other regions on the surface of the housing 110. In some embodiments, the touch region may protrude from other regions on the surface of the housing 110, such that the user can recognize the touch region. In some embodiments, the touch region may be disposed near the at least one sensor 120. In some embodiments, the touch region may cover a connection portion between the housing 110 and the at least one sensor 120. In some embodiments, the user may act on the touch region through touch operations such as tapping, long pressing, or sliding, and the at least one sensor 120 may recognize the touch operation of the user. In some embodiments, the housing 110 may have any suitable material or shape. For example, the material of the housing 110 may include plastic, resin, glass, metal, or the like, or any combination thereof. In some embodiments, to facilitate the user to recognize the touch region, the material of the touch region may be different from the materials of other regions of the housing 110. In some embodiments, to facilitate the overall manufacturing of the housing 110, the material of the touch region may be the same as the materials of other regions of the housing 110. More descriptions regarding the housing 110 may be found in FIGS. 3-5 and related descriptions thereof.

The at least one sensor 120 may generate an electrical signal based on a mass and damping change of a vibration system to recognize the touch operation performed on the touch region. The vibration system refers to a system formed when the at least one sensor 120 vibrates and drives the entire touch sensor device 100 including the housing 110 to vibrate. In some embodiments, to allow the touch of the user on the surface of the housing 110 to affect the vibration of the at least one sensor 120 to a great extent, the at least one sensor 120 may be rigidly connected to the housing 110. For example, the at least one sensor 120 may be welded and fixed on the housing 110. As another example, the at least one sensor 120 may be adhesively fixed on the housing 110. As another example, the at least one sensor 120 may be welded and fixed on the housing 110 through a connector. In some embodiments, when the touch operation of the user acts on the touch region of the housing 110, the mass and the damping of the entire vibration system can be increased, thereby changing a vibration mode of the vibration system. The at least one sensor 120 may generate an output signal (e.g., the electrical signal) in response to a change in the vibration mode, and recognize the touch operation of the user based on the output signal.

In some embodiments, the at least one sensor 120 may include a signal transmitting unit 121, a signal receiving unit 122, and a processor 123. The signal transmitting unit 121 may be configured to generate a vibration signal under the action of an excitation signal. The signal receiving unit 122 may be configured to receive the vibration signal and generate the output signal. The processor 123 may be configured to recognize the touch operation performed on the touch region based on the output signal. In some embodiments, for the signal receiving unit 122 to directly receive the vibration signal of the signal transmitting unit 121, the signal receiving unit 122 may be connected to the signal transmitting unit 121. More descriptions regarding the at least one sensor 120 may be found in FIGS. 3-6 and related descriptions thereof.

In some embodiments, when the signal transmitting unit 121 vibrates, the signal transmitting unit 121 may drive the housing, the signal receiving unit 122, and other components (e.g., the processor 123) to vibrate together to form the vibration system. In some embodiments, a resonance frequency $\omega_0$ and a quality factor Q of the vibration system may be expressed as:

$$\omega_0 = \sqrt{\frac{K}{M}}, \tag{1}$$

$$Q = \frac{\omega_0 M}{R}, \tag{2}$$

where K denotes an effective stiffness of the vibration system, M denotes an effective mass of the vibration system, R denotes an effective damping of the vibration system, and the resonance frequency $\omega_0$ denotes a resonance frequency (e.g., a first-order resonance frequency, a second-order resonance frequency, a third-order resonance frequency, or other higher-order resonance frequency) of any order of the vibration system.

In some embodiments, when the user touches the touch region of the housing 110, an additional mass $M_f$ and an additional damping $R_f$ may be provided to the entire vibration system. According to equation (1) and equation (2), the additional mass $M_f$ and additional damping $R_f$ may cause the resonance frequency $\omega_0$ and the Q value of the vibration system to decrease. The change in the resonance frequency $\omega_0$ and the Q value of the vibration system may be reflected in an energy transfer function from the signal transmitting unit 121 to the signal receiving unit 122. For example, when an excitation signal to the signal transmitting unit 121 is constant, the output signal generated by the signal receiving unit 122 changes with the change in the resonance frequency $\omega_0$ and the Q value of the vibration system. That is, when the excitation signal is constant, the output signal generated by the signal receiving unit 122 is different when the user touches or does not touch the touch region of the housing 110. Therefore, the processor 123 can recognize the touch operation performed on the touch region according to the change of the output signal.

Figure 2:
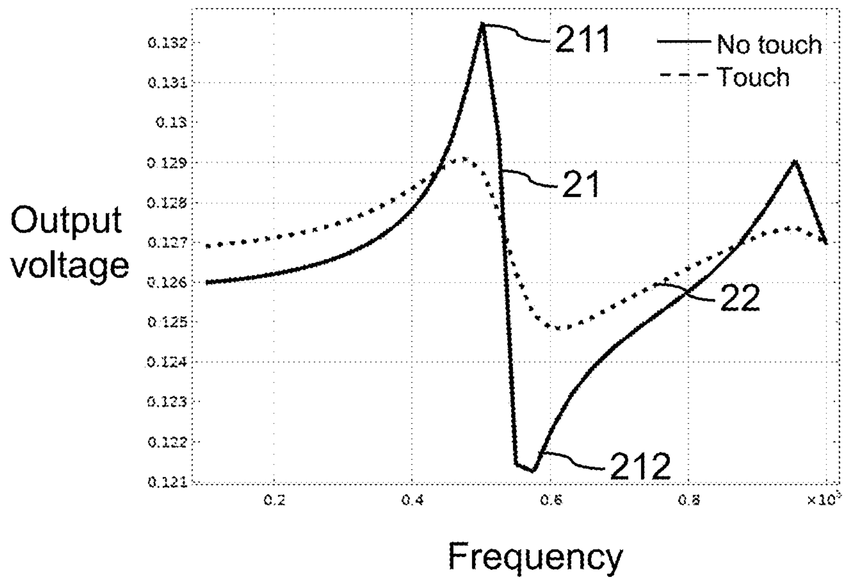
FIG. 2 is a schematic diagram illustrating vibration response curves of a vibration system before and after a touch according to some embodiments of the present disclosure.

FIG. 2 is a schematic diagram illustrating vibration response curves of a vibration system before and after a touch according to some embodiments of the present disclosure. Curve 21 is a vibration response curve of the vibration system when a touch region is not touched, and curve 22 is a vibration response curve of the vibration system when the touch region is touched. As shown in FIG. 2, according to the curve 21 and the curve 22, when a user does not touch the touch region, the vibration response curve of the vibration system has a resonance peak 211 with a relatively large amplitude near a resonance frequency (e.g., 50 kHz). When the user touches the touch region, the amplitude of the resonance peak 211 decreases, indicating that a corresponding output voltage decreases. In other frequency ranges (e.g., less than the resonance frequency, or greater than the resonance frequency (e.g., 60 KHz-90 kHz)), when the user touches the touch region, the amplitude of the vibration response curve increases, indicating that the corresponding output voltage increases. That is, when a frequency of an excitation signal is near the resonance frequency, the touch makes the output voltage generated by the signal receiving unit 122 decrease; and when the excitation signal is at other frequencies (e.g., when the frequency of the excitation signal is less than the resonance frequency of the vibration system), the touch makes the output voltage generated by the signal receiving unit 122 increase. Therefore, the touch operation of the user can be recognized according to the voltage change of the output signal generated by the signal receiving unit 122.

In some embodiments, to prevent the excitation signal from affecting the operation of an electronic device including the touch sensor device 100, the frequency of the excitation signal may be different from an operation frequency of the electronic device. For example, the electronic device may include an earphone, and correspondingly, the frequency of the excitation signal may be adjusted to a frequency range that is not received or is not sensitive to human ears. For example, the frequency of the excitation signal may not be less than 16000 Hz. As another example, the frequency of the excitation signal may not be less than 18000 Hz. As another example, the frequency of the excitation signal may not be less than 20000 Hz.

In some embodiments, the excitation signal may include a single-frequency electrical signal. The signal transmitting unit 121 may vibrate under the action of the single-frequency electrical signal, and the signal receiving unit 122 may receive the vibration of the signal transmitting unit 121 and generate the output signal. Referring to FIG. 2 and the description thereof, when the excitation signal is constant, the output signal generated by the signal receiving unit 122 when the user touches may be different from the output signal generated by the signal receiving unit 122 when the user does not touch the touch region of the housing 110. Thus, the processor 123 may determine whether the touch occurs based on an amplitude of the output signal corresponding to the single-frequency electrical signal. In some embodiments, a frequency of the single-frequency electrical signal may be much less than a resonance frequency of the vibration system (e.g., the frequency of the single-frequency electrical signal may be less than the resonance frequency of the vibration system, and a difference between the frequency of the single-frequency electrical signal and the resonance frequency of the vibration system may be greater than 5 kHz, 10 KHz, 20 kHz, 30 kHz, etc.), and when the voltage amplitude of the output signal measured by the processor 123 increases, it can be determined that the touch occurs. Merely by way of example, the resonance frequency of the vibration system may be 50 kHz, and the frequency of the single-frequency electrical signal may be 20 KHz. When the voltage amplitude (e.g., 0.127 V) of the output signal measured by the processor 123 is greater than the previously measured voltage amplitude (e.g., 0.126 V), it can be determined that the touch occurs. In some embodiment, the processor 123 may also determine whether the touch occurs based on a difference threshold. For example, when the voltage amplitude of the output signal measured by the processor 123 is greater than the previously measured voltage amplitude, and a difference between the voltage amplitude of the output signal measured by the processor 123 and the previously measured voltage amplitude is greater than the difference threshold, it can be determined that the touch occurs. In some embodiments, the frequency of the single-frequency electrical signal may be near the resonance frequency of the vibration system (e.g., the difference between the frequency of the single-frequency electrical signal and the resonance frequency of the vibration system may be less than 10 kHz, 5 KHz, 1 kHz, 500 Hz, etc.), and when the voltage amplitude of the output signal measured by the processor 123 decreases, it can be determined that the touch occurs. Merely by way of example, the resonance frequency of the vibration system may be 50 kHz, and the frequency of the single-frequency electrical signal may be 50 kHz. When the voltage amplitude (e.g., 0.129 V) of the output signal measured by the processor 123 is less than the previously measured voltage amplitude (e.g., 0.132 V), it can be determined that the touch occurs. In some embodiments, the processor 123 may determine whether the touch occurs based on a difference threshold. For example, when the voltage amplitude of the output signal measured by the processor 123 is less than the previously measured voltage amplitude, and a difference between the voltage amplitude of the output signal measured by the processor 123 and the previously measured voltage amplitude is greater than the difference threshold, it can be determined that the touch occurs. In some embodiments, the frequency of the single-frequency electrical signal may be greater than the resonance frequency of the vibration system. For example, the frequency of the single-frequency electrical signal may be in a range of 60 kHz-90 KHz. When the voltage amplitude of the output signal measured by the processor 123 increases, it can be determined that the touch occurs. By determining whether the touch occurs based on the single-frequency electrical signal, the calculation efficiency can be improved and the determination process can be simplified.

In some embodiments, the excitation signal may include electrical signals of multiple frequencies. The signal receiving unit 122 may generate multiple output signals corresponding to the electrical signals of multiple frequencies under the action of the electrical signals of multiple frequencies. The processor 123 may perform a weighting operation on the multiple output signals and determine whether the touch occurs according to a result of the weighting operation. In some embodiments, frequencies of the electrical signals of multiple frequencies may be less than the resonance frequency of the vibration system. In some embodiments, the frequencies of the electrical signals of multiple frequencies may be near the resonance frequency of the vibration system. In some embodiments, the frequencies of the electrical signals of multiple frequencies may be greater than the resonance frequency of the vibration system (e.g., the frequencies of the electrical signals of multiple frequencies may be in a range of 60 kHz-90 kHz). Merely by way of example, the resonance frequency of the vibration system may be 50 kHz, and the excitation signal may include 5 electrical signals with frequencies of 16 kHz, 17 kHz, 18 kHz, 19 kHz, and 20 kHz, respectively. The signal receiving unit 122 may generate 5 output signals corresponding to the 5 electrical signals under the excitation of the 5 electrical signals. The processor 123 may perform the weighting operation on amplitudes of the 5 output signals to determine the result of the weighting operation. In some embodiments, weights corresponding to the 5 output signals may be the same, and the result of the weighting operation may be an average of amplitudes of the 5 output signals. In some embodiments, the weights corresponding to the five output signals may be different. For example, as shown in FIG. 2, when the frequency of the excitation signal is less than the resonance frequency, the farther away from the resonance frequency, the greater the difference between the curve 21 and the curve 22, indicating that when the frequency of the excitation signal is less than the resonance frequency, the farther away from the resonance frequency, the greater the change of the voltage amplitude caused by the touch. Thus, the farther away from the resonance frequency, the greater the weight corresponding to the voltage amplitude, thereby highlighting the change of the output signal and improving the sensitivity of the touch sensor device 100. Further, the processor 123 may compare the result of the weighting operation with the previously measured output voltage to determine whether the touch occurs. The previously measured output voltage may also be a result of the weighting operation of the previous output signals corresponding to the 5 electrical signals. When the processor 123 determines that the current result of the weighting operation is greater than the previously measured voltage amplitude (or the previous result of the weighting operation), the processor 123 may determine that the touch occurs. In some embodiments, the processor 123 may determine whether the touch occurs based on a difference threshold. For example, when the processor 123 determines that the current result of the weighting operation is greater than the previously measured voltage amplitude (or the previous result of the weighting operation), and a difference between the current result of the weighting operation and the previously measured voltage amplitude is greater than the difference threshold, the processor 123 may determine that the touch occurs. In some embodiments, the touch may be determined based on the result of the weighting operation corresponding to the electrical signals of multiple frequencies, which can avoid an occasional error during the operation of the sensor 120 and improve the determination accuracy of the touch.

In some embodiments, the excitation signal may include a sweep-frequency electrical signal. The sweep-frequency electrical signal refers to an electrical signal in a certain frequency range. The signal receiving unit 122 may generate a sweep-frequency output signal corresponding to the sweep-frequency electrical signal, and the sweep-frequency output signal may be expressed as a curve. The processor 123 may obtain the curve corresponding to the sweep-frequency output signal and determine whether the touch occurs based on the shape of the curve. In some embodiments, when the obtained curve is flatter than the previously acquired curve, the processor 123 may determine that the touch occurs. For example, referring to FIG. 2, the fact that the obtained curve is relatively flat can be expressed as a decrease in an amplitude difference between the resonance peak 211 and the resonance valley 212. In some embodiments, a changing trend of the output signal generated by the signal transmitting unit 121 in a wider frequency range may be determined based on the sweep-frequency electrical signal, which further improves the determination accuracy of the touch.

In some embodiments, an excitation mode of the excitation signal may include a continuous excitation or an interval excitation. The continuous excitation refers to that the excitation signal acts on the signal transmitting unit 121 at a fixed frequency (e.g., 100 times per second) or a floating frequency (e.g., 100 times in the 1st second, 10 times in the 2nd second, 100 times in the 3rd second, etc.). The interval excitation refers to that the excitation signal acts on the signal transmitting unit 121 at a certain interval (e.g., 30 seconds), at a fixed frequency or a floating frequency.

In some embodiments, the processor 123 may obtain a duration of the voltage change of the output signal to determine whether the user is tapping or long pressing. For example, when the duration of a voltage increase or decrease of the output signal is 0.1 s-1 s, the processor 123 determines that the touch operation is tapping. As another example, when the duration of the voltage increase or decrease of the output signal is 1 s-2 s, the processor 123 determines that the touch operation is long pressing. In some embodiments, since the additional mass $M_f$ and the additional damping $R_f$ are related to a pressing force applied by the user to the touch region, the processor 123 may obtain the amplitude of the voltage increase or decrease of the output signal to determine whether the user is pressing hard or lightly. For example, when the amplitude of the voltage increase or decrease of the output signal is 10%-30%, the processor 123 may determine that the touch operation is light touching. As another example, when the amplitude of the voltage increase or decrease of the output signal is 30%-50%, the processor 123 may determine that the touch operation is hard pressing.

Figure 3:
FIG. 3 is a schematic diagram illustrating an exemplary touch sensor device according to some embodiments of the present disclosure.
Figure 3:
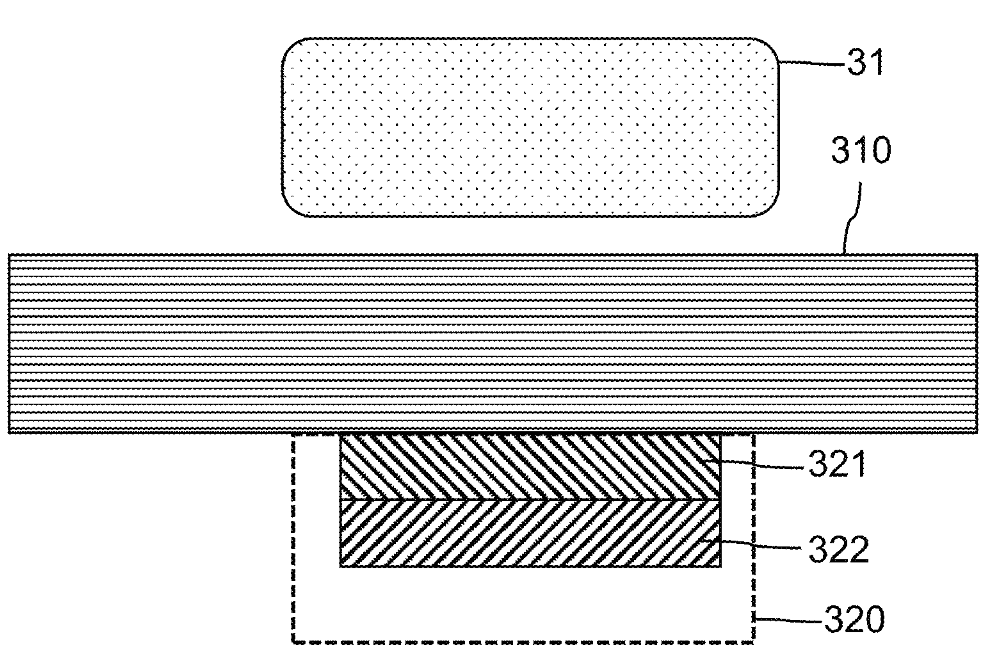

FIG. 3 is a schematic diagram illustrating an exemplary touch sensor device according to some embodiments of the present disclosure.

As shown in FIG. 3, in some embodiments, a touch sensor device 300 may include a housing 310 and at least one sensor 320. The housing 310 is a structure including a touch region (not shown in the figure). In some embodiments, the touch region may be disposed on a surface of the housing 310, and a user 31 (e.g., a finger) may contact the touch region to change an equivalent stiffness, mass, damping, and other parameters of the housing 310, thereby affecting a vibration mode of an entire vibration system corresponding to the touch sensor device 300. The at least one sensor 320 may be disposed near the touch region. For example, as shown in FIG. 3, the at least one sensor 320 may be disposed on an inner side wall of the housing 310 facing the touch region. In some embodiments, the at least one sensor 320 may include a signal transmitting unit 321, a signal receiving unit 322, and a processor (not shown in the figure). The signal transmitting unit 321 may be configured to generate a vibration signal under the action of an excitation signal, and the signal receiving unit 322 may be configured to receive the vibration signal to generate an output signal. In some embodiments, to make the vibration of the signal transmitting unit 321 drive the housing 310 and other components to vibrate to a great extent, the signal transmitting unit 321 may be fixed on a side wall of the housing 310 facing the touch region. In some embodiments, to make the signal receiving unit 322 receive the vibration of the signal transmitting unit 321, the signal receiving unit 322 may be connected to a side of the signal transmitting unit 321 away from the housing 310. In some embodiments, the signal receiving unit 322 may be fixed on the side wall of the housing 310 facing the touch region and connected to the signal transmitting unit 321. The processor may be configured to recognize a touch operation performed on the touch region according to the output signal generated by the signal receiving unit 322. In some embodiments, the processor may be disposed at any position of the housing 310. For example, the processor may be disposed on the surface of the housing 310 or a side wall of an inner cavity of the housing 310. In some embodiments, to avoid the mass and the damping of the processor affecting the vibration of the signal transmitting unit 321, the processor may be suspended in the housing 310. For example, the processor may be connected to the side wall of the housing 310 through an elastic member. In some embodiments, the processor may be disposed at any position outside the housing 310. For example, the processor may be disposed at any position of the electronic device including the touch sensor device 300.

The at least one sensor provided by the embodiments of the present disclosure is exemplarily described below with reference to FIGS. 4-6.

Figure 4:
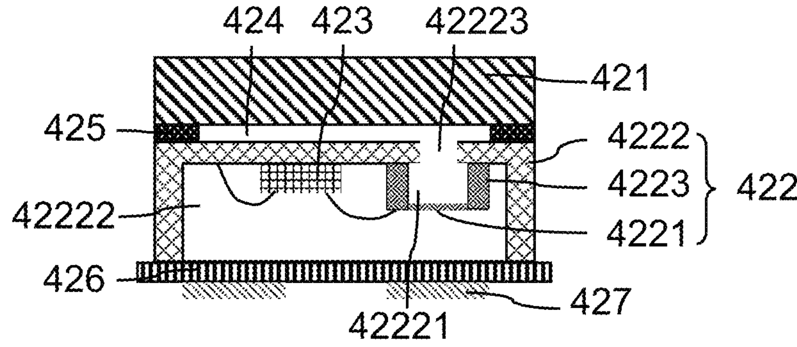
FIG. 4 is a schematic diagram illustrating an exemplary sensor according to some embodiments of the present disclosure.

FIG. 4 is a schematic diagram illustrating an exemplary sensor according to some embodiments of the present disclosure. In some embodiments, the at least one sensor 120 shown in FIG. 1 and/or the at least one sensor 320 shown in FIG. 3 may be implemented by a sensor 420 shown in FIG. 4. In some embodiments, the sensor 420 may be connected to a housing (e.g., the housing 110, and the housing 310, etc.) of a touch sensor device to recognize a touch operation performed on a touch region of the housing.

In some embodiments, the signal transmitting unit may include a piezoelectric patch, and the signal receiving unit may include an air conduction microphone. Taking the sensor 420 shown in FIG. 4 as an example, the sensor 420 may include a piezoelectric patch 421, an air conduction microphone 422, and a processor 423. The piezoelectric patch 421 may be configured as the signal transmitting unit, and the air conduction microphone 422 may be configured as the signal receiving unit.

The piezoelectric patch 421 refers to a device capable of converting an excitation signal into a mechanical vibration. In some embodiments, the piezoelectric patch 421 may be a single-layer piezoelectric patch or a multi-layer piezoelectric patch. In some embodiments, a side of the piezoelectric patch 421 away from the air conduction microphone 422 may be connected to the housing (e.g., the housing 310) of the touch sensor device. In some embodiments, the piezoelectric patch 421 may include a piezoelectric layer. Under the action of an electric field provided by the excitation signal, the piezoelectric layer may deform due to an inverse piezoelectric effect, causing the piezoelectric patch 421 to generate the mechanical vibration, thereby generating a vibration signal (e.g., a sound). In some embodiments, the piezoelectric layer may be made of a piezoelectric material. Exemplary piezoelectric materials may include a piezoelectric ceramic, a piezoelectric crystal, a piezoelectric polymer (e.g., polyvinylidene fluoride), or the like, or any combination thereof.

The air conduction microphone 422 may receive the vibration signal generated by the piezoelectric patch 421 to generate an output signal. As shown in FIG. 4, the air conduction microphone 422 may include a diaphragm 4221, a microphone housing 4222, and a diaphragm connection portion 4223. The microphone housing 4222 may form an accommodation cavity configured to accommodate the diaphragm 4221 and the diaphragm connection portion 4223. The diaphragm 4221 may be disposed in the accommodation cavity and connected to an inner wall of the microphone housing 4222 through the diaphragm connection portion 4223. For example, the diaphragm connection portion 4223 may be a cylindrical structure penetrated from two ends. One end of the cylindrical structure may be connected to the microphone housing 4222, and an opening shape, size, etc. of the other end of the cylindrical structure may be adapted to the shape of the diaphragm 4221, so as to be connected to the diaphragm 4221. In some embodiments, the diaphragm 4221 (and the diaphragm connection portion 4223) may divide the accommodation cavity of the microphone housing 4222 to form a front cavity 42221 and a rear cavity 42222.

In some embodiments, a cavity 424 may be formed between the piezoelectric patch 421 and the microphone housing 4222 (or the diaphragm 4221). For example, the sensor 420 may further include a connection portion 425. The connection portion 425 may be disposed between the air conduction microphone 422 and the piezoelectric patch 421 and configured to connect the air conduction microphone 422 and the piezoelectric patch 421, and cooperate with the air conduction microphone 422 and the piezoelectric patch 421 to form the cavity 424. For example, the connection portion 425 may be a cylindrical structure penetrated from two ends, including a first end connected to the piezoelectric patch 421 and a second end connected to the air conduction microphone 422. The cavity 424 may be formed between the connection portion 425, the piezoelectric patch 421, and the microphone housing 4222. It should be noted that the connection portion 425 may be other structures that can cooperate with the piezoelectric patch 421 and the air conduction microphone 422 to form the cavity 424, and the connection portion 425 may cooperate with the piezoelectric patch 421 and the air conduction microphone 422 in other connection modes to form the cavity 424. For example, the first end of the connection portion 425 may include a first opening, and the shape and the size of the first opening may be adapted to the shape and the size of the piezoelectric patch 421. The piezoelectric patch 421 may be connected to a side wall corresponding to the first opening through a peripheral side of the piezoelectric patch 421. As another example, the second end of the connection portion 425 may include a second opening, and the shape and the size of the second opening may be adapted with the shape and the size of the microphone housing 4222. The connection portion 425 may be inserted into the microphone housing 4222 such that the microphone housing 4222 closes the second opening at the second end of the connection portion 425.

In some embodiments, the cavity 424 may be in flow communication with the front cavity 42221. For example, a hole portion 42223 may be disposed on the microphone housing 4222, and the cavity 424 may be in flow communication with the front cavity 42221 through the hole portion 42223. When the piezoelectric patch 421 vibrates in response to an excitation signal, the vibration may cause a change in air pressure in the cavity 424 and/or the front cavity 42221 to drive the diaphragm 4221 to vibrate. The air conduction microphone 422 may further convert the vibration signal of the diaphragm 4221 into an electrical signal, thereby generating an output signal. Merely by way of example, the air conduction microphone 422 may include any one of a dynamic microphone, an aluminum ribbon microphone, a condenser microphone, an electret microphone, a piezoelectric microphone, or the like, or any combination thereof. Taking the dynamic microphone as an example, the air conduction microphone 422 may also include a magnetic circuit structure. The diaphragm 4221 may be connected to a voice coil, and the voice coil may be located in a magnetic gap formed by the magnetic circuit structure. When the diaphragm 4221 vibrates in response to a change in the air pressure of the front cavity 42221, the voice coil may move with the vibration of the diaphragm 4221, and generate the electrical signal under the action of a magnetic field. Taking the piezoelectric microphone as an example, in some embodiments, the diaphragm 4221 may include a piezoelectric layer and an electrode layer. When the diaphragm 4221 deforms, the piezoelectric layer is subjected to a deformation stress to generate an electric potential difference (i.e., a voltage), and the electrode layer can collect the electric potential difference to generate the electrical signal.

The processor 423 may recognize the touch operation based on the output signal generated by the air conduction microphone 422. In some embodiments, the processor 423 may be disposed in the rear cavity 42222 and mechanically connected to the inner wall of the microphone housing 4222. In some embodiments, the processor 423 may be connected to the air conduction microphone 422 in a wired or wireless manner to receive the output signal generated by the air conduction microphone 422. The sensor 420 may be connected to the housing of the touch sensor device through the piezoelectric patch 421, and form a vibration system together with the housing and other components of the touch sensor device. When the user touches the touch region on the housing, the vibration mode of the vibration system changes, such that the output signal generated by the air conduction microphone 422 changes correspondingly. The processor 423 can determine whether the user touches the touch region on the housing based on the change in the output signal so as to recognize the touch operation of the user.

In some embodiments, the sensor 420 may include a substrate 426. The substrate 426 may be configured to fix and/or support the air conduction microphone 422. In some embodiments, the substrate 426 may be disposed on the air conduction microphone 422, and the microphone housing 4222 and the substrate 426 may be physically connected to form an acoustic cavity (i.e., an accommodation cavity). In some embodiments, one end of the microphone housing 4222 away from the piezoelectric patch 421 may be connected to the substrate 426, and the substrate 426 may be configured to fix and support the microphone housing 4222. The substrate 426 enables the air conduction microphone 422 to be processed and produced as an independent component. In some embodiments, the material of the substrate 426 may include metal (e.g., iron, copper, stainless steel, etc.), an alloy, non-metal (e.g., plastic, rubber, resin, etc.), or the like, or any combination thereof.

In some embodiments, the sensor 420 may include a pad 427. The pad 427 may be elastically connected to other components (e.g., the housing) of the touch sensor device to reduce the impact of the connection between the sensor 420 and other components, thereby avoiding affecting the transmission and reception of the vibration in the sensor 420. In some embodiments, the pad 427 may be made of an elastic material. Exemplary elastic materials may include plastic, foam, rubber, latex, silicone, sponge, or the like, or any combination thereof.

Figure 5:
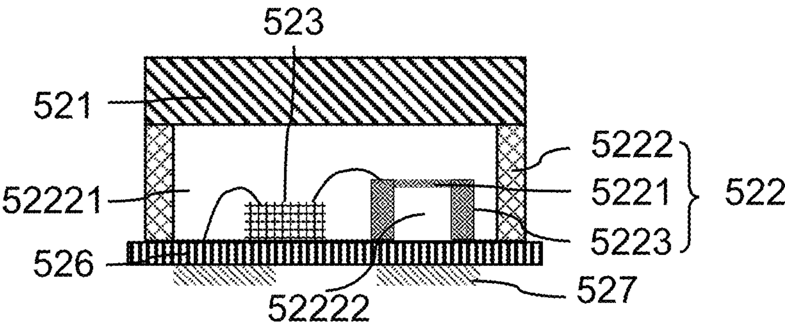
FIG. 5 is a schematic diagram illustrating an exemplary sensor according to some embodiments of the present disclosure.

FIG. 5 is an exemplary diagram illustrating an exemplary sensor according to some embodiments of the present disclosure.

A piezoelectric patch 521, a processor 523, a substrate 526, and a pad 527 of sensor 520 and a diaphragm 5221 and a diaphragm connection portion 5223 of an air conduction microphone 522 shown in FIG. 5 may be similar to the corresponding components of the sensor 420 shown in FIG. 4 in structure, which are not repeated here.

The difference between the sensor 520 and the sensor 420 is that the structure of a microphone housing 5222 is different. As shown in FIG. 5, the microphone housing 5222 is a cylindrical structure penetrated from two ends, and includes a first end close to the piezoelectric patch 521 and a second end close to the substrate 526. In some embodiments, an end surface of the first end of the microphone housing 5222 may be connected to a side of the piezoelectric patch 521 close to the air conduction microphone 522, and an end surface of the second end of the microphone housing 5222 may be connected to a side of the substrate 526 close to the piezoelectric patch 521. In this way, the microphone housing 5222, the piezoelectric patch 521, and the substrate 526 enclose to form an accommodation cavity. The diaphragm 5221 is disposed in the accommodation cavity and connected to the substrate 526 through the diaphragm connection portion 5223. The diaphragm 5221 (and the diaphragm connection portion 5223) may divide the accommodation cavity into a front cavity 52221 and a rear cavity 52222. When the piezoelectric patch 521 vibrates in response to an excitation signal, the vibration may cause a change in air pressure in the front cavity 52221 to drive the diaphragm 5221 to vibrate to generate a vibration signal. The air conduction microphone 522 may further convert the vibration signal of the diaphragm 5221 into an electrical signal to generate an output signal. The processor 523 may be disposed in the front cavity 52221 and receive the output signal, so as to recognize a touch operation of a user based on the output signal.

In some embodiments, a peripheral side of the microphone housing 5222 may be flush with a peripheral side of the piezoelectric patch 521 and a peripheral side of the substrate 526 to make the overall structure of the sensor 520 flat. In some embodiments, the peripheral side of the microphone housing 5222 may be convex or concave with respect to the peripheral side of the piezoelectric patch 521 and/or the substrate 526.

Figure 6:
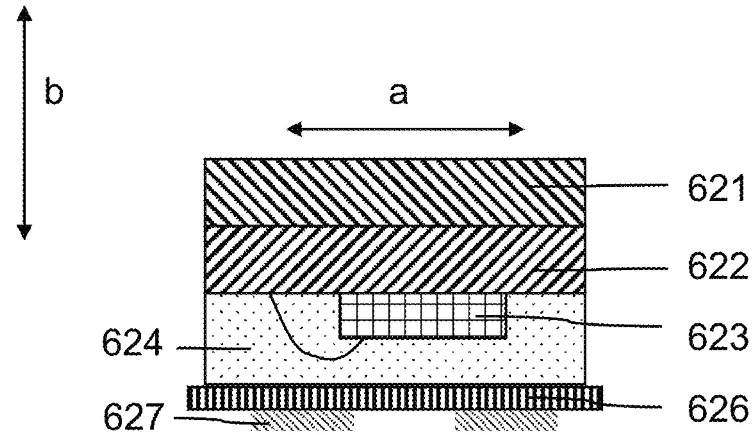
FIG. 6 is a schematic diagram illustrating an exemplary sensor according to some embodiments of the present disclosure.

FIG. 6 is a schematic diagram illustrating an exemplary sensor according to some embodiments of the present disclosure.

In some embodiments, the signal transmitting unit and the signal receiving unit may both be piezoelectric patches. Taking a sensor 620 shown in FIG. 6 as an example, the sensor 620 may include a first piezoelectric patch 621, a second piezoelectric patch 622, and a processor 623. The first piezoelectric patch 621 may be configured as the signal transmitting unit, and the second piezoelectric patch 622 may be configured as the signal receiving unit. In some embodiments, the first piezoelectric patch 621 and/or the second piezoelectric patch 622 may be a single-layer piezoelectric patch or a multi-layer piezoelectric patch.

The first piezoelectric patch 621 may be configured to convert an excitation signal into a mechanical vibration. In some embodiments, the first piezoelectric patch 621 may include a piezoelectric layer. Under the action of an electric field provided by the excitation signal, the piezoelectric layer may deform due to an inverse piezoelectric effect to cause the first piezoelectric patch 621 to generate the mechanical vibration. A vibration direction (e.g., a direction b shown in FIG. 6) of the mechanical vibration may be perpendicular to a length direction (e.g., a direction a shown in FIG. 6) of the first piezoelectric patch 621. In some embodiments, one side of the first piezoelectric patch 621 along the vibration direction may be connected to a housing of a touch sensor device, and the other side of the first piezoelectric patch may be connected to the second piezoelectric patch 622.

The second piezoelectric patch 622 may be configured to receive the vibration generated by the first piezoelectric patch 621 to generate an output signal. As shown in FIG. 6, the first piezoelectric patch 621 and the second piezoelectric patch 622 are stacked in a vibration direction of the first piezoelectric patch 621, and one side of the first piezoelectric patch 621 away from the housing of the touch sensor device may be connected to the second piezoelectric patch 622. When the first piezoelectric patch 621 generates the mechanical vibration based on the excitation signal, the second piezoelectric patch 622 may receive the vibration of the first piezoelectric patch 621 to generate an electrical signal. For example, the second piezoelectric patch 622 may include a piezoelectric layer. When the second piezoelectric patch 622 receives the vibration of the first piezoelectric patch 621, the piezoelectric layer may generate the electrical signal due to a piezoelectric effect. The electrical signal may be used as the output signal of the second piezoelectric patch 622.

The processor 623 may recognize a touch operation according to the output signal generated by the second piezoelectric patch 622. In some embodiments, the processor 623 may be disposed on one side of the second piezoelectric patch 622 away from the first piezoelectric patch 621, and mechanically connected to the second piezoelectric patch 622. In some embodiments, the processor 623 may be connected to the second piezoelectric patch 622 through a lead or wirelessly, to receive the output signal generated by the second piezoelectric patch 622. The sensor 620 may be connected to the housing of the touch sensor device through the first piezoelectric patch 621, and form a vibration system together with the housing and other components of the touch sensor device. When a user touches a touch region on the housing, a vibration mode of the vibration system changes, such that the output signal generated by the second piezoelectric patch 622 changes correspondingly. The processor 623 may determine whether the user touches the touch region on the housing according to the change of the output signal, so as to recognize the touch operation of the user.

In some embodiments, the sensor 620 may further include a substrate 626 and a pad 627. In some embodiments, the substrate 626 and the pad 627 shown in FIG. 6 may be similar to the substrate 426 and the pad 427 shown in FIG. 4, which are not repeated here.

In some embodiments, the sensor 620 may further include a protective package 624. The protective package 624 may be configured to connect or protect one or more components (e.g., the processor 623) of the sensor 620, and protect the one or more components from damage while packaging the one or more components. As shown in FIG. 6, one side of the protective package 624 may be connected to the side of the second piezoelectric patch 622 away from the first piezoelectric 621, and the other side of the protective package 624 may be connected to the substrate 626, such that the second piezoelectric patch 622, the processor 623, and the substrate 626 may be connected to achieve the effect of packaging. In some embodiments, the material of the protective package 624 may include a material having a shock absorbing effect, such as resin, rubber, latex, or the like, or any combination thereof.

It should be noted that the above description of the at least one sensor (e.g., the sensor 420, the sensor 520, the sensor 620, etc.) is only for illustration and is not intended to limit the scope of the present disclosure. For those having ordinary skills in the art, various changes and modifications can be made under the guidance of the specification. However, these changes and modifications do not depart from the scope of the present disclosure. For example, the description of the position, shape, size, material, etc. of the one or more components of the sensor shown in FIGS. 4-6 is only an example, and the one or more components may be mounted at any position and have any size and/or shape. Merely by way of example only, the processor (e.g., the processor 423, the processor 523, the processor 623, etc.) may be fixed on the signal receiving unit (e.g., the air conduction microphone 422, the air conduction microphone 522, the second piezoelectric film 622, etc.), fixed on the substrate, or suspended and fixed in the protective package (e.g., the protective package 624). In addition, the connection manner of the one or more components of the sensor shown in FIGS. 4-6 is variable. The connection between any two components may include a welding connection, a key connection, a pin connection, an interference fit connection, or the like, or any combination thereof.

In some embodiments, the processor of the at least one sensor (e.g., the processor 423, the processor 523, the processor 623, etc.) may be an application-specific integrated circuit (ASIC). The ASIC may be integrated with the signal receiving unit and configured to process the output signal generated by the signal receiving unit. After touch recognition, the ASIC may send a recognition result to a main control chip of an electronic device (e.g., an earphone, a smart bracelet, etc.), and the main control chip may directly determine a subsequent control operation based on the recognition result. The ASIC can avoid occupying the computing power space of the main control chip of the electronic device (e.g., the earphone, and smart bracelet, etc.), thereby improving the efficiency of touch recognition. In some embodiments, the processor of the at least one sensor may be omitted. The at least one sensor may include only the signal transmitting unit and the signal receiving unit. The output signal generated by the signal receiving unit may be transmitted to the electronic device including the touch sensor device, and the main control chip of the electronic device may process the output signal to recognize the touch operation of the user.

FIGS. 1-6 are exemplarily illustrated by taking the recognition of the touch operation of the user as an example. In some embodiments, the sensor or the touch sensor device may also be used to detect whether the electronic device (e.g., the earphone, the smart bracelet, etc.) is worn. For example, the touch region may be disposed on a side of the electronic device close to a human body when the electronic device is worn. When the electronic device is worn, a wearing portion may contact the touch region, which causes a change in the vibration signal generated by the signal transmitting unit, and the output signal generated by the signal receiving unit changes correspondingly. The processor may recognize whether the electronic device is worn according to the output signal. When the output signal changes, the processor recognizes that the electronic device is worn, and may respond to other processes of the electronic device such as answering a call, automatically playing music, etc. When the electronic device is taken off and the signal transmitting unit generates a vibration signal based on the excitation signal, the output signal generated by the signal receiving unit remains constant. The processor may recognize that the electronic device is taken off, and may respond to other processes of the electronic device, such as hanging up, pausing music, adjusting the volume, etc. In some embodiments, the touch sensor device may include a plurality of sensors. More descriptions regarding the plurality of sensors may be found in FIGS. 7-8C and related descriptions thereof.

Figure 7:
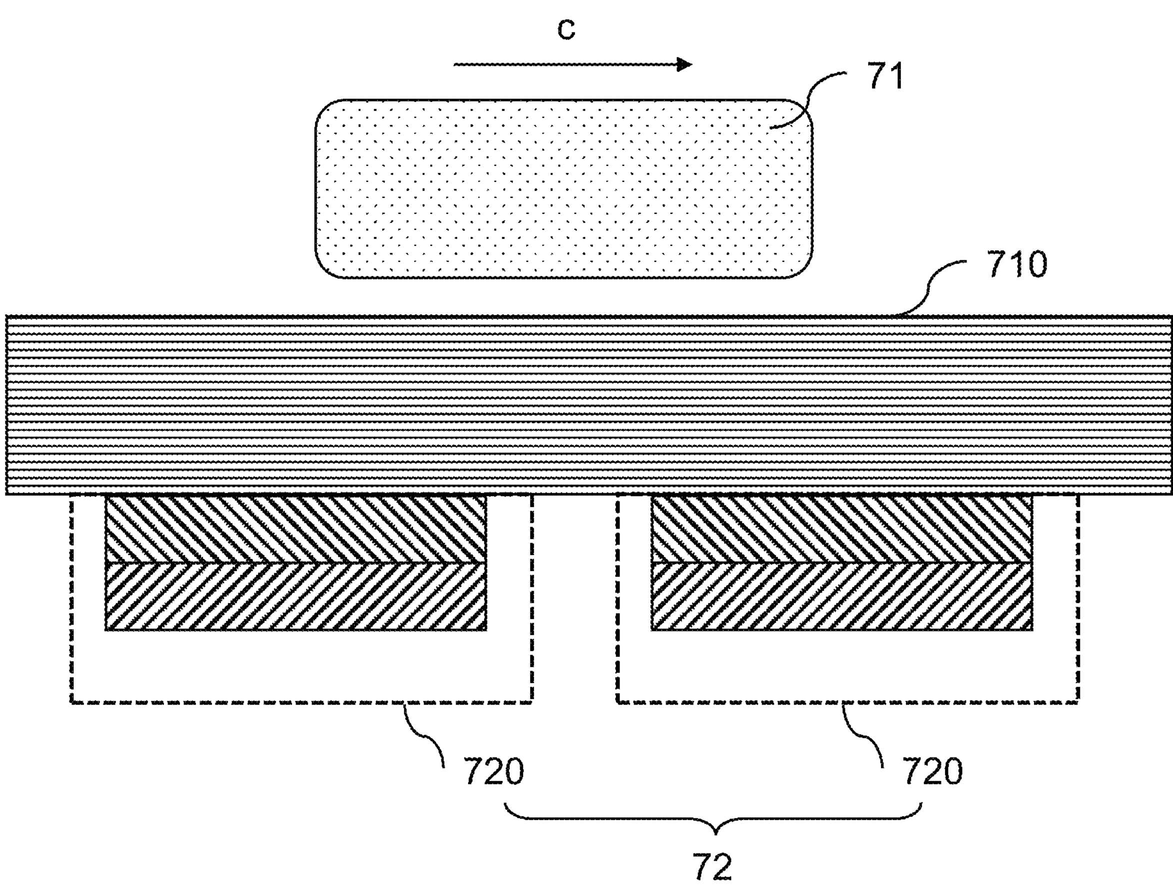
FIG. 7 is a schematic diagram illustrating an exemplary touch sensor device according to some embodiments of the present disclosure.

FIG. 7 is a schematic diagram illustrating an exemplary touch sensor device 700 according to some embodiments of the present disclosure.

In some embodiments, the touch sensor device may include two or more sensors. The two or more sensors may form a sensor array near a touch region on a housing. A processor may obtain an output signal generated by the sensor array and recognize a touch operation of a user based on the output signal. For example, the touch operation of the user on the touch region including the sensor array may include a sliding touch. When the user (e.g., within a preset time period) presses two or more sensors of the sensor array in sequence, the output signal generated by each of the two or more sensors changes in sequence. Thus, the processor may recognize a sliding touch operation of the user based on an overall output signal generated by the sensor array. In some embodiments, the two or more sensors may share one processor. In some embodiments, the two or more sensors may each have a processor. The two or more processors corresponding to the two or more sensors may be connected to another processor (e.g., a sensor array processor, a main control chip of an electronic device, etc.), and the processor may receive the output signals transmitted by the two or more processors, respectively, so as to recognize the sliding touch operation of the user. In some embodiments, by setting the sensor array, the user may perform a variety of different touch operations, thereby improving the convenience and diversity of the touch operations.

As shown in FIG. 7, the at least two sensors may include two sensors 720. The two sensors 720 may be arranged in parallel near the touch region on the housing 710 to form a sensor array 72. A user 71 may slide through the two sensors 720 along an arrangement direction c of the two sensors 720. In some embodiments, the plurality of sensors 720 may be any of the at least one sensor shown in FIGS. 1-6. More descriptions regarding the housing 710 may be found in FIGS. 1-3. In some embodiments, the user may slide through the at least two sensors 720 in a direction opposite to the direction c. In some embodiments, the user may slide back and forth on at least two of the sensors 720 in a row.

Figure 8A:
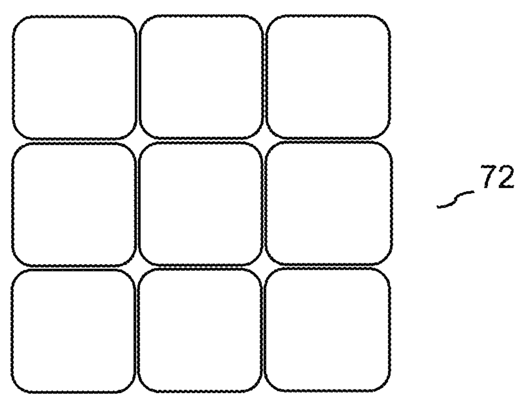
FIG. 8A is a schematic diagram illustrating a distribution of a sensor array according to some embodiments of the present disclosure.

FIG. 8A is a schematic diagram illustrating a distribution of a sensor array according to some embodiments of the present disclosure. As shown in FIG. 8A, a plurality of sensors of the sensor array 72 may be arranged in a rectangular array, which is conducive to increasing the diversity of sliding gestures. It should be noted that the count of the sensors of the sensor array 72 and the arrangement thereof are not limited to the arrangement shown in FIG. 8A. For example, the sensor array 72 may include two, three, four, five, or more sensors, and the arrangement of the sensors of the sensor array 72 may include but is not limited to other irregular shapes such as a rectangular arrangement, a triangular arrangement, a wavy line arrangement, etc.

Figure 8B:
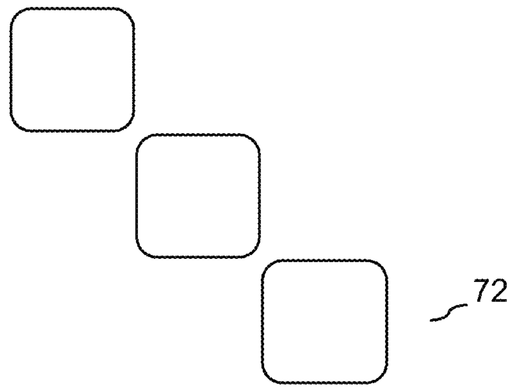
FIG. 8B is a schematic diagram illustrating a distribution of another sensor array according to some embodiments of the present disclosure.

FIG. 8B is a schematic diagram illustrating a distribution of another sensor array according to some embodiments of the present disclosure. As shown in FIG. 8B, a plurality of sensors of the sensor array 72 may be obliquely arranged in a row. In some embodiments, the plurality of sensors of the sensor array 72 may also be arranged in an X-shaped arrangement, a V-shaped arrangement, or a W-shaped arrangement.

Figure 8C:
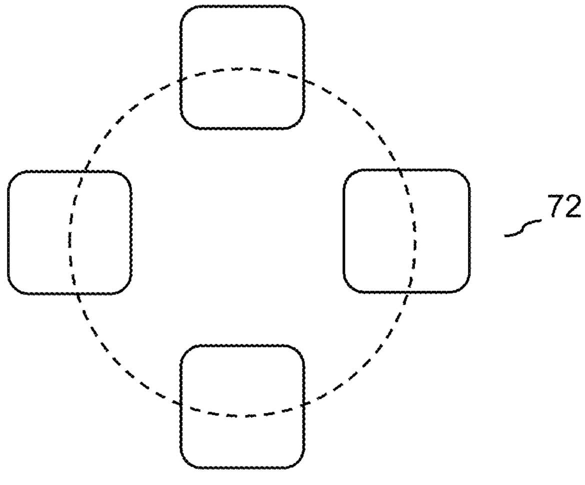
FIG. 8C is a schematic diagram illustrating a distribution of another sensor array according to some embodiments of the present disclosure.

FIG. 8C is a schematic diagram illustrating a distribution of another sensor array according to some embodiments of the present disclosure. As shown in FIG. 8C, a plurality of sensors of the sensor array 72 may be arranged in a circular shape. In some embodiments, the plurality of sensors of the sensor array 72 may also be arranged in an ellipse, a diamond, a triangle, or in a combination of the arrangement shown in FIG. 8A and FIG. 8B, or in any combination thereof.

The embodiments of the present disclosure further provide a touch sensor device. The touch sensor device may include a housing (e.g., the housing 310 shown in FIG. 3) configured to provide a touch region, a sensor fixed near the touch region, and a processor. The sensor may include a vibration element and an inductor element. The vibration element and the inductor element may be connected in parallel to form a loop. The loop may oscillate under the action of an excitation signal to generate an output signal. The processor may be configured to recognize a touch operation performed on the touch region according to an oscillation frequency of the output signal. The touch sensor device is described below with reference to FIGS. 9-11.

Figure 9:
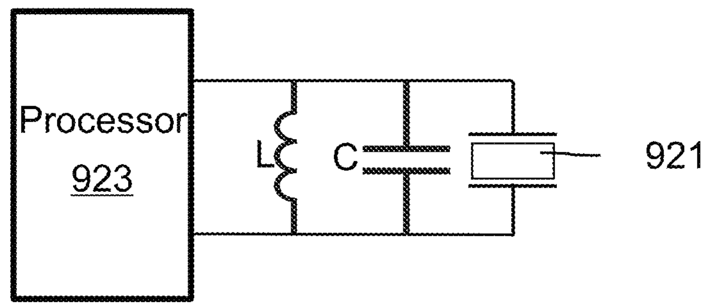
FIG. 9 is a schematic diagram illustrating a circuit of a sensor according to some embodiments of the present disclosure.

FIG. 9 is a schematic diagram illustrating a circuit of a sensor according to some embodiments of the present disclosure. As shown in FIG. 9, a sensor 900 may include a vibration element 921, an inductor element L, a capacitor element C, and a processor 923.

The vibration element 921 may vibrate under the action of an excitation signal. In some embodiments, as shown in FIG. 9, the vibration element 921 may be connected to the inductor element L and the capacitor element C to form a loop (also referred to as a resonance loop). For example, the vibration element 921, the inductor element L, and the capacitor element C may be connected in parallel. As another example, the vibration element 921 may be connected in series with the capacitor element C, and further connected in parallel with the inductor element L. In some embodiments, the vibration element 921 may include a piezoelectric patch (e.g., the piezoelectric patch 421 shown in FIG. 4, the piezoelectric patch 521 shown in FIG. 5, the first piezoelectric patch 621 shown in FIG. 6, etc.) configured to convert the excitation signal into a mechanical vibration. When the vibration element 921 vibrates under the action of the excitation signal, a piezoelectric effect of the piezoelectric patch plays the role of electromechanical coupling, which couples the vibration of the vibration element 921 (or a vibration system) to an LC electrical resonance of the resonance loop. In such cases, the resonance loop may generate an oscillation under the action of the excitation signal. The processor 923 may be connected to the resonance loop to read out an oscillation frequency of the resonance loop.

In some embodiments, the sensor 900 may be connected to a housing including a touch region through the vibration element 921. The vibration element 921 may form the vibration system with the housing and other components. When a user slides or presses the touch region on the housing (e.g., through a finger, a stylus, etc.), an equivalent stiffness, mass, damping, and other parameters of the vibration system may change. The change may cause a change in the oscillation frequency of the resonance loop. For example, when the user touches the housing, an additional mass may be provided to the vibration system to cause the oscillation frequency of the vibration system to decrease. The processor 923 may determine whether the user touches the housing based on the change in the oscillation frequency, so as to recognize the touch operation of the user.

In some embodiments, to ensure the sensitivity of the sensor, a resonance frequency f1 of the vibration element 921 may match with a resonance frequency f2 of the resonance loop. For example, a ratio of f1 to f2 may be in a range of 0.1-10. As another example, the ratio of f1 to f2 may be in a range of 0.1-5. As another example, the ratio of f1 to f2 may be in a range of 0.5-2. As another example, f1 may be equal to f2. In some embodiments, the resonance frequency f1 of the vibration element 921 may be related to properties (e.g., a shape, a size, a material, etc.) of the vibration element 921 (e.g., the piezoelectric patch). In some embodiments, the resonance frequency f1 of the vibration element 921 may be in a range of 100 KHz-100 MHz. In some embodiments, the resonance frequency f1 of the vibration element 921 may be in a range of 100 kHz to 10 MHz. In some embodiments, the resonance frequency f1 of the vibration element 921 may be in a range of 100 KHz-1 MHZ. In some embodiments, the resonance frequency f2 of the resonance loop may be related to parameters such as an inductance value of the inductor element L and a capacitance of the capacitor element C of the resonance loop. In some embodiments, to match the resonance frequency f2 of the resonance loop with the resonance frequency f1 of the vibration element 921, the inductance value of the inductor element L may be in a range of 0.05 uH-500 uH. In some embodiments, the inductance value of the inductor element L may be in a range of 0.1 uH-300 uH. In some embodiments, the inductance value of the inductor element L may be in a range of 0.1 uH-100 uH. In some embodiments, to enable the processor 923 to accurately measure the oscillation frequency of the resonance loop, a quality factor (i.e., a Q value) of the resonance loop may be greater than 1. In some embodiments, the quality factor of the resonance loop may be greater than 2.

In some embodiments, the vibration element 921 may have a self-capacitance Cs. Therefore, the capacitor element C may be omitted. The vibration element 921 with the self-capacitance Cs may be connected in parallel with the inductor element L to form the resonance loop.

Figure 10:
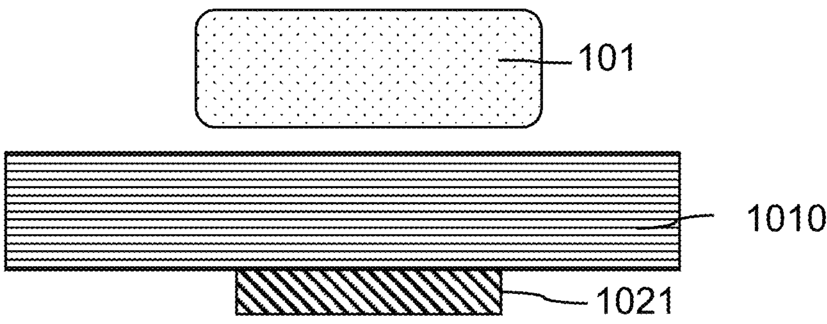
FIG. 10 is a schematic diagram illustrating an exemplary touch sensor device according to some embodiments of the present disclosure.

FIG. 10 is a schematic diagram illustrating an exemplary touch sensor device according to some embodiments of the present disclosure. As shown in FIG. 10, a touch sensor device 1000 may include a housing 1010 and a piezoelectric patch 1021. The piezoelectric patch 1021 may be fixed on a side wall of the housing 1010 facing a touch region. In some embodiments, the housing 1010 may be the same or similar to the housing 310 shown in FIG. 3, and the piezoelectric patch 1021 may be the same or similar to the piezoelectric patch 421 shown in FIG. 4. In some embodiments, the piezoelectric patch 1021 may be connected to an inductor element (or an inductor element and a capacitor element) to form a resonance loop as shown in FIG. 9. Under the action of an excitation signal, the resonance loop may oscillate and generate an output signal. In some embodiments, the output signal may include an oscillation frequency of the resonance loop. When a user 101 contacts the touch region on the housing 1010, the oscillation frequency of the resonance loop decreases. Accordingly, the oscillation frequency measured by a processor decreases. Thus, the processor can recognize a touch operation of the user.

Figure 11:
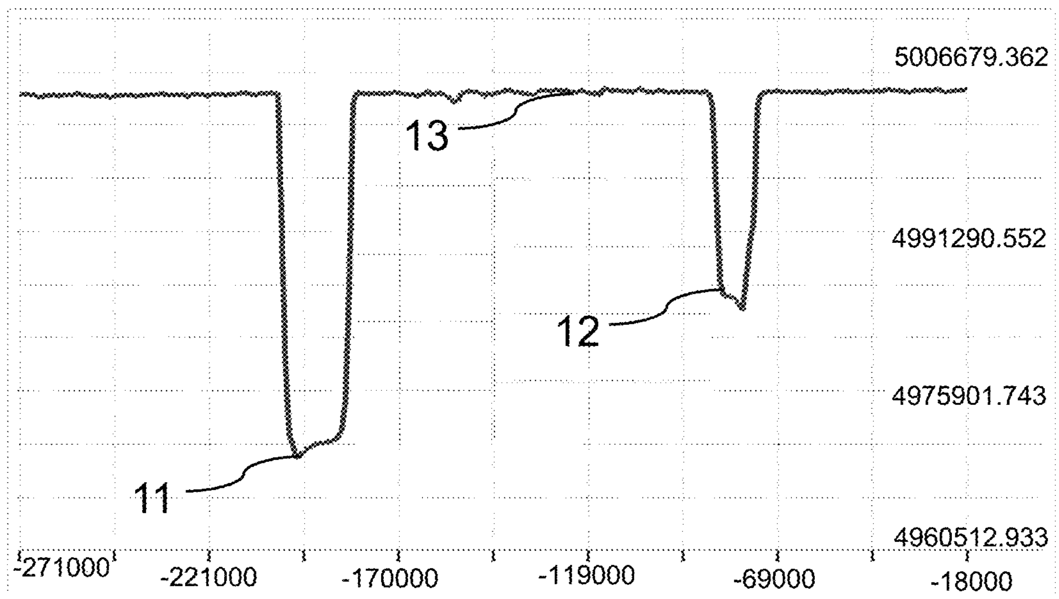
FIG. 11 is a schematic diagram illustrating vibration response curves of a vibration system when touching different positions of a housing.

In some embodiments, when the user 101 touches different positions of the housing 1010 (or the piezoelectric patch 1021), an amplitude of the decrease in the oscillation frequency may be different. FIG. 11 is a schematic diagram illustrating vibration response curves of a vibration system when touching different positions of a housing. As shown in FIG. 11, a valley 11 is a vibration response curve of a vibration system when touching a touch region on the housing 1010 corresponding to the piezoelectric patch 1021 (e.g., when touching a touch region facing the piezoelectric patch 1021, or touching a touch region facing a center of the piezoelectric patch 1021), a valley 12 is a vibration response curve of the vibration system when touching a region on the housing 1010 corresponding to an edge of the piezoelectric patch 1021, and a curve 13 between the valley 11 and the valley 12 is a vibration response curve of the vibration system when touching other positions (e.g., a position away from the piezoelectric patch 1021) on the housing 1010. According to FIG. 11, when most of an additional mass caused by the touch is applied to the piezoelectric patch 1021, the oscillation frequency is greatly reduced; when a small part of the additional mass caused by the touch is applied to the piezoelectric patch 1021, the oscillation frequency is slightly reduced; and when the additional mass caused by the touch is not applied to the piezoelectric patch 1021, the effect on the vibration of the piezoelectric patch 1021 or the oscillation of the resonance loop is small.

Therefore, a sensor may be fixed near the touch region to improve the sensitivity of touch recognition. For example, the touch region and a vibration element (or a signal transmitting unit) of the sensor may face each other on two sides of the housing, and a center of the vibration element may face a center of the touch region. In some embodiments, a positional relationship between the touch region and the sensor may be changed to satisfy the needs of different application scenarios. For example, other components of the sensor may face the touch region on the two sides of the housing.

According to the method described in the present disclosure, the touch operation of the user is recognized by measuring the impact of the touch operation on the overall vibration mode of the vibration system (e.g., the vibration system formed by the sensor, the housing connected to the sensor, and other components), which can avoid directly measuring the impact of the touch operation on a certain parameter of the sensor can be avoided, thereby improving the anti-interference ability of the sensor or the touch recognition process. In addition, the method described in the present disclosure can make the sensor adapt to various housing structures, which improves the degree of freedom of product appearance design.

It should be noted that FIGS. 1-11 are only used for exemplary descriptions and do not constitute a limitation thereto. For those having ordinary skills in the art, various changes and modifications may be made according to the guidance of the present disclosure. Different embodiments may produce different beneficial effects. In different embodiments, the beneficial effects that may be produced may be any one or any combination of the above, or any other beneficial effects that may be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or features may be combined as suitable in one or more embodiments of the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A touch sensor device, comprising:

a housing, configured to provide a touch region; and at least one sensor, configured to be fixed near the touch region, wherein the at least one sensor includes:

a signal transmitting unit, configured to generate a vibration signal under the action of an excitation signal; wherein the signal transmitting unit includes a piezoelectric patch;

a signal receiving unit, configured to receive the vibration signal and generate an output signal, wherein the signal receiving unit is disposed on a side of the signal transmitting unit away from the housing, the signal transmitting unit is located between the housing and the signal receiving unit; wherein the signal receiving unit includes an air conduction microphone, the air conduction microphone includes a diaphragm, and a cavity is formed between the piezoelectric patch and the diaphragm; and a processor, configured to recognize a touch operation performed on the touch region according to the output signal.

2. The touch sensor device of claim 1, wherein the air conduction microphone includes a microphone housing, the microphone housing forms an accommodation cavity for accommodating the diaphragm, and the diaphragm is configured to divide the accommodation cavity into a front cavity and a rear cavity, wherein the cavity is in flow communication with the front cavity, and the processor is disposed in the rear cavity.

3. The touch sensor device of claim 1, wherein the excitation signal includes a single-frequency electrical signal, and the processor is configured to determine whether a touch occurs according to an amplitude of an output signal corresponding to the single-frequency electrical signal.

4. The touch sensor device of claim 3, wherein the signal transmitting unit is configured to vibrate to drive the touch sensor device including the housing to vibrate to form a vibration system;

a frequency of the single-frequency electrical signal is less than a resonance frequency of the vibration system; and to recognize the touch operation performed on the touch region, the processor is configured to:

determine that the touch operation occurs when a voltage amplitude of the output signal increases.

5. The touch sensor device of claim 3, wherein the signal transmitting unit is configured to vibrate to drive the touch sensor device including the housing to vibrate to form a vibration system;

a frequency of the single-frequency electrical signal is near a resonance frequency of the vibration system; and to recognize the touch operation performed on the touch region, the processor is configured to:

determine that the touch operation occurs when a voltage amplitude of the output signal decreases.

6. The touch sensor device of claim 1, wherein the excitation signal includes electrical signals of multiple frequencies, the output signal includes output signals of multiple frequencies corresponding to the electrical signals of multiple frequencies, and the processor is configured to perform a weighting operation on the output signals of multiple frequencies and determine whether a touch occurs based on a result of the weighting operation.

7. The touch sensor device of claim 1, wherein the excitation signal includes a sweep-frequency electrical signal, the output signal includes a sweep-frequency output signal corresponding to the sweep-frequency electrical signal, and the processor is configured to obtain a curve corresponding to the sweep-frequency output signal and determine whether a touch occurs according to a shape of the curve.

8. The touch sensor device of claim 1, wherein the touch region is disposed on a surface of the housing, and the at least one sensor is disposed in an inner cavity formed by the housing on an inner side wall of the housing facing the touch region.

9. The touch sensor device of claim 1, wherein the touch sensor device further includes a connection portion disposed between the air conduction microphone and the piezoelectric patch, and the connection portion is configure to connect the air conduction microphone and the piezoelectric patch, and cooperate with the air conduction microphone and the piezoelectric patch to form the cavity.

10. The touch sensor device of claim 2, wherein a hole portion is disposed on the microphone housing, and the cavity is in flow communication with the front cavity through the hole portion.

11. The touch sensor device of claim 2, wherein the air conduction microphone includes a diaphragm connection portion in the accommodation cavity, the diaphragm is disposed in the accommodation cavity and connected to an inner wall of the microphone housing through the diaphragm connection portion.

12. The touch sensor device of claim 2, wherein the cavity is located outside of the front cavity and the rear cavity, wherein when the piezoelectric patch vibrates in response to the excitation signal, vibrations of the piezoelectric patch cause a change in air pressure in the cavity or the front cavity to drive the diaphragm to vibrate.

13. A touch sensor device, comprising:

a housing, configured to provide a touch region; and a sensor, configured to be fixed near the touch region, wherein the sensor includes:

a vibration element, wherein the vibration element includes a piezoelectric patch, and a resonance frequency of the piezoelectric patch is in a range of 100 kHz-100 MHz;

an inductor element, wherein the vibration element and the inductor element are connected in parallel to form a loop, and the loop oscillates under the action of an excitation signal to generate an output signal; and a processor, configured to recognize a touch operation performed on the touch region according to an oscillation frequency of the output signal.

14. The touch sensor device of claim 13, wherein an inductance value of the inductor element is in a range of 0.1 uH-100 uH.

15. The touch sensor device of claim 13, wherein the sensor further includes a capacitor element, and the capacitor element is connected to the vibration element and the inductor element to form the loop.

16. The touch sensor device of claim 15, wherein the capacitor element is connected in series or in parallel with the vibration element.

17. The touch sensor device of claim 13, wherein a value of a quality factor of the loop is greater than 2.

18. The touch sensor device of claim 13, wherein the sensor is connected to the housing through the vibration element, and the vibration element forms a vibration system with the housing.

19. The touch sensor device of claim 13, wherein the touch region and the vibration element face each other on two sides of the housing.

20. The touch sensor device of claim 13, wherein a center of the vibration element faces a center of the touch region.

* * * * *